US008695540B2

(12) United States Patent
Minick

(10) Patent No.: US 8,695,540 B2
(45) Date of Patent: Apr. 15, 2014

(54) FUEL-CRACKING DIESEL ENGINE SYSTEM

(75) Inventor: Alan B. Minick, Madison, AL (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 0 days.

(21) Appl. No.: 13/526,135

(22) Filed: Jun. 18, 2012

(65) Prior Publication Data
US 2013/0333637 A1   Dec. 19, 2013

(51) Int. Cl.
*F02B 43/08* (2006.01)

(52) U.S. Cl.
USPC ............ 123/3; 123/1 A; 123/27 GE; 123/526

(58) Field of Classification Search
USPC .......................... 123/1 A, 3, 27 GE, 525, 526
See application file for complete search history.

(56) References Cited

U.S. PATENT DOCUMENTS

| | | | |
|---|---|---|---|
| 2,945,800 A | 7/1960 | Ciapetta et al. | |
| 3,165,888 A | 1/1965 | Keon | |
| 3,752,225 A | 8/1973 | Johnson et al. | |
| 3,806,035 A | 4/1974 | Calder | |
| 4,108,114 A * | 8/1978 | Kosaka et al. | 123/3 |
| 4,831,818 A | 5/1989 | Martin | |
| 5,151,171 A | 9/1992 | Spadaccini et al. | |
| 5,165,224 A | 11/1992 | Spadaccini et al. | |
| 5,176,814 A | 1/1993 | Spadaccini et al. | |
| 5,189,876 A | 3/1993 | Hirota et al. | |
| 5,207,053 A | 5/1993 | Spadaccini et al. | |
| 5,232,672 A | 8/1993 | Spadaccini et al. | |
| 5,316,743 A | 5/1994 | LeBlanc et al. | |
| 5,392,595 A | 2/1995 | Glickstein et al. | |
| 5,414,992 A | 5/1995 | Glickstein et al. | |
| 5,463,866 A | 11/1995 | Klees | |
| 5,997,730 A | 12/1999 | Drake et al. | |
| 6,315,815 B1 | 11/2001 | Spadaccini et al. | |
| 6,382,471 B2 | 5/2002 | Bonningue et al. | |
| 6,709,492 B1 | 3/2004 | Spadaccini et al. | |
| 6,769,242 B1 | 8/2004 | Balepin | |
| 6,799,417 B2 | 10/2004 | Hewitt | |
| 6,832,471 B2 | 12/2004 | Hewitt | |
| 6,939,392 B2 | 9/2005 | Huang et al. | |
| 6,981,472 B2 * | 1/2006 | Bromberg et al. | 123/3 |
| 7,174,861 B2 * | 2/2007 | Allston et al. | 123/1 A |
| 7,334,396 B2 | 2/2008 | Erickson et al. | |

(Continued)

FOREIGN PATENT DOCUMENTS

| | | |
|---|---|---|
| EP | 0854278 | 2/2003 |
| GB | 745012 | 2/1956 |

(Continued)

OTHER PUBLICATIONS

Fan, et al., Investigation of Vaporized Kerosene Injection and Combustion in a Supersonic Model Combustor, Jan.-Feb. 2006, Journal of Propulsion and Power, vol. 22, No. 1, 103-110.

(Continued)

*Primary Examiner* — Noah Kamen
*Assistant Examiner* — Grant Moubry
(74) *Attorney, Agent, or Firm* — Carlson, Gaskey & Olds, P.C.

(57) ABSTRACT

A system includes a diesel engine and a fuel-cracking system in fluid communication with a fuel supply to the diesel engine.

21 Claims, 2 Drawing Sheets

(56) References Cited

U.S. PATENT DOCUMENTS

| | | | |
|---|---|---|---|
| 7,334,407 B2 | 2/2008 | Spadaccini et al. | |
| 7,367,183 B2 * | 5/2008 | Eberspach | 60/286 |
| 7,377,112 B2 * | 5/2008 | Spadaccini et al. | 60/772 |
| 7,389,636 B2 | 6/2008 | Fowler et al. | |
| 7,513,260 B2 | 4/2009 | Huang et al. | |
| 7,524,340 B2 | 4/2009 | May | |
| 7,555,904 B1 | 7/2009 | Osga et al. | |
| 7,565,795 B1 | 7/2009 | Horn et al. | |
| 7,621,119 B2 | 11/2009 | Brown et al. | |
| 7,624,579 B2 | 12/2009 | Peters | |
| 7,685,807 B2 | 3/2010 | Watkins et al. | |
| 7,757,477 B2 | 7/2010 | Kehret et al. | |
| 8,015,823 B2 * | 9/2011 | Vanderspurt et al. | 60/777 |
| 8,245,671 B2 * | 8/2012 | Leone | 123/3 |
| 2003/0079463 A1 | 5/2003 | McKinney | |
| 2005/0016527 A1 | 1/2005 | Barger et al. | |
| 2006/0263277 A1 | 11/2006 | Tillman et al. | |
| 2007/0022976 A1 | 2/2007 | Lerner | |
| 2007/0130956 A1 | 6/2007 | Chen | |
| 2007/0234728 A1 | 10/2007 | Peters | |
| 2008/0078364 A1 | 4/2008 | Antonov et al. | |
| 2009/0038591 A1 | 2/2009 | Lee et al. | |
| 2009/0072490 A1 | 3/2009 | Cowan et al. | |
| 2009/0152172 A1 | 6/2009 | Huang | |
| 2009/0166001 A1 | 7/2009 | Vanderspurt et al. | |
| 2009/0313998 A1 | 12/2009 | Senofonte et al. | |
| 2010/0257839 A1 | 10/2010 | Watkins et al. | |
| 2011/0290457 A1 * | 12/2011 | Vanderspurt et al. | 165/138 |

FOREIGN PATENT DOCUMENTS

| | | |
|---|---|---|
| JP | 2001115908 A | 4/2001 |
| JP | 2004137993 A | 5/2004 |
| KR | 1019980022852 A | 7/1998 |

OTHER PUBLICATIONS

Huang, et al., RP-1: A Potential Substitution Fuel for JP-7 in Endothermic Fuel-Cooled Applications *, Research Paper, United Technologies Corporation.

International Search Report and Written Opinion for International Application No. PCT/US2013/043813 completed on Aug. 23, 2013.

* cited by examiner

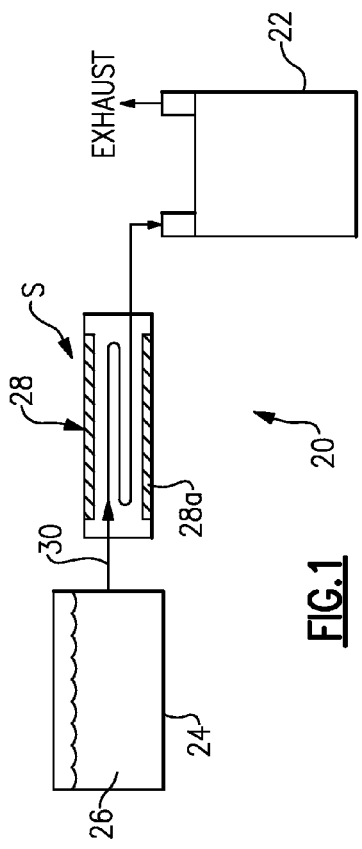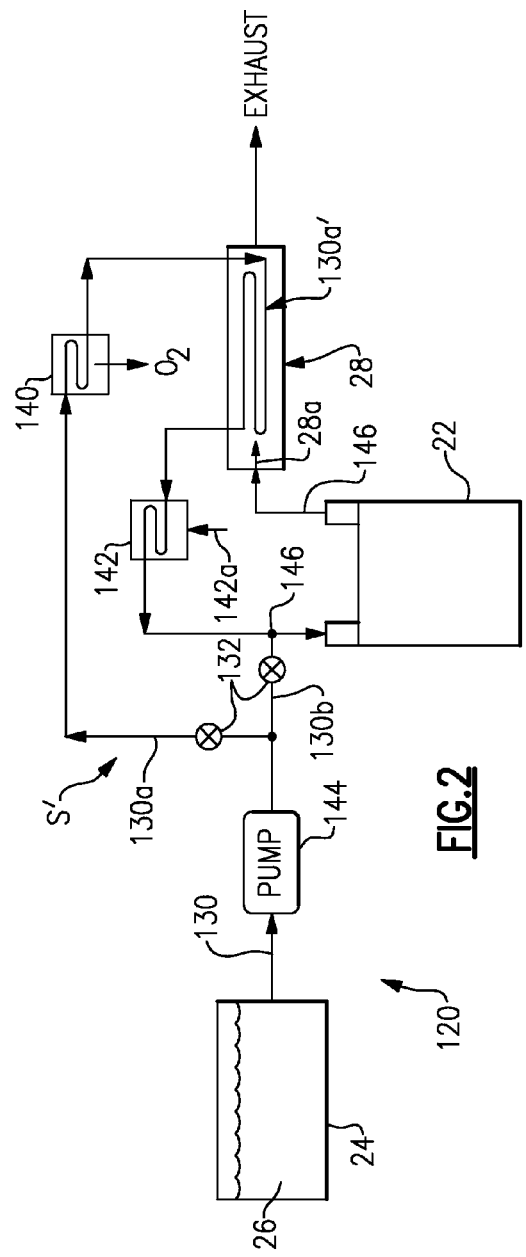

FUEL-CRACKING DIESEL ENGINE SYSTEM

BACKGROUND OF THE INVENTION

This disclosure relates to improvements in diesel engines. Diesel engines are commonly known and used in transportation and other industries, for example. As readily appreciated, the cost of fuel is a significant operating expense. Improvements in fuel consumption can provide a significant economic benefit and also reduce environmental impact.

SUMMARY OF THE INVENTION

A system according to an exemplary aspect of the present disclosure includes a diesel engine and a fuel-cracking system in fluid communication with a fuel supply to the diesel engine.

In a further non-limiting embodiment, the fuel-cracking system includes a fuel-cracking heat exchanger and a closed feed line connecting the fuel supply and the diesel engine and extending through the fuel-cracking heat exchanger.

In a further non-limiting embodiment of any of the foregoing examples, the fuel-cracking heat exchanger is in communication with an exhaust line of the diesel engine.

In a further non-limiting embodiment of any of the foregoing examples, the closed feed line divides into a first section that extends through the fuel-cracking heat exchanger and a second section that bypasses the fuel-cracking heat exchanger.

In a further non-limiting embodiment of any of the foregoing examples, each of the first section and the second section includes a respective flow control valve.

In a further non-limiting embodiment of any of the foregoing examples, the first section and the second section merge at a location upstream of injection in the engine and downstream of the fuel-cracking heat exchanger.

In a further non-limiting embodiment of any of the foregoing examples, the fuel-cracking heat exchanger includes an electric heater.

In a further non-limiting embodiment of any of the foregoing examples, the fuel-cracking heat exchanger includes a flame heater.

A further non-limiting embodiment of any of the foregoing examples includes a fuel deoxygenator upstream of the fuel-cracking heat exchanger and through which the closed feed line extends.

A further non-limiting embodiment of any of the foregoing examples includes a cooler device located upstream of the diesel engine and downstream of the fuel-cracking heat exchanger, and through which the closed feed line extends.

In a further non-limiting embodiment of any of the foregoing examples, the cooler device is an air cooler device.

In a further non-limiting embodiment of any of the foregoing examples, a section of the closed feed line that extends through the fuel-cracking heat exchanger includes a catalyst material.

A further non-limiting embodiment of any of the foregoing examples includes a hydrocarbon-based fuel, and the hydrocarbon-based fuel includes, at a location prior to the fuel-cracking heat exchanger, ethanol.

A further non-limiting embodiment of any of the foregoing examples includes a hydrocarbon-based fuel, and the hydrocarbon-based fuel includes a suspended catalyst material therein.

A diesel engine system according to an exemplary aspect of the present disclosure includes a fuel tank, a fuel deoxygenator device, a fuel-cracking heat exchanger, a cooler device, and a closed feed line connecting the fuel tank and the diesel engine and extending through the fuel deoxygenator device, the fuel-cracking heat exchanger and the cooler device.

In a further non-limiting embodiment of any of the foregoing examples, the closed feed line divides into a first section that extends through the fuel-cracking heat exchanger and a second section that bypasses the fuel-cracking heat exchanger.

In a further non-limiting embodiment of any of the foregoing examples, the first section and the second section merge at a location upstream of injection in the engine and downstream of the fuel-cracking heat exchanger.

A method of operating a diesel engine system according to an exemplary aspect of the present disclosure includes (a) cracking a hydrocarbon-based fuel in an environment substantially free of oxygen to produce a cracked fuel and (b) providing the cracked fuel into a diesel engine.

A further non-limiting embodiment of any of the foregoing examples includes deoxygenating the hydrocarbon-based fuel prior to the heating of step (a).

In a further non-limiting embodiment of any of the foregoing examples, the cracking includes heating the hydrocarbon-based fuel to a temperature sufficient to crack the hydrocarbon-based fuel, and then cooling the cracked fuel prior to step (b).

In a further non-limiting embodiment of any of the foregoing examples, step (b) includes providing the hydrocarbon-based fuel in a supercritical state.

A further non-limiting embodiment of any of the foregoing examples includes dividing a flow of the hydrocarbon-based fuel prior to step (a) such that a first portion of the hydrocarbon-based fuel is provided for the heating of step (a) to produce the cracked fuel and a second portion of the hydrocarbon-based fuel bypasses the heating of step (a).

A further non-limiting embodiment of any of the foregoing examples includes, after step (a) and prior to step (b), merging the cracked fuel and the second portion of the hydrocarbon-based fuel.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 illustrates an example fuel-cracking diesel engine system.

FIG. 2 illustrates another example diesel engine system.

DETAILED DESCRIPTION

Figure 3:
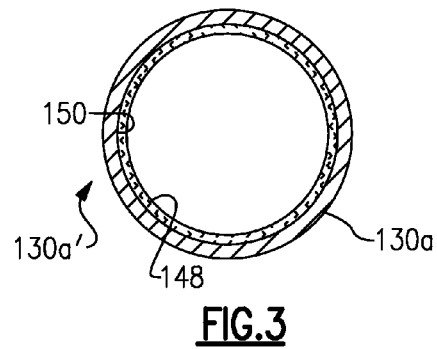
FIG. 3 illustrates an example of a cross-section of a closed feed line that has a catalyst material.

FIG. 1 schematically illustrates an example system 20, such as a fuel-cracking diesel engine system. As will be described herein, the system 20 includes features for improving performance, such as improved fuel economy and enhanced power generation.

In this example, the system 20 includes a diesel engine 22 and a fuel-cracking system S in fluid communication with a fuel supply, here fuel tank 24, to the diesel engine 22. The fuel tank 24 provides a hydrocarbon-based fuel 26 to the diesel engine 22, a fuel-cracking heat exchanger 28 ("cracker"), and a closed feed line 30 connecting the fuel tank 24 and the diesel engine 22. The closed feed line 30 extends through the fuel-cracking heat exchanger 28. The fuel-cracking system S in this example includes the fuel-cracking heat exchanger 28 and the closed feed line 30.

As used herein, a "hydrocarbon-based fuel" is a hydrocarbon chain fuel with a majority of its hydrocarbon chains having greater than 10 carbon atoms. The term "closed" as used herein with reference to the closed feed line 30 means that air or other gases are not introduced into the line 30 between the fuel tank 24 and the engine 22. A "diesel engine" as used herein is an internal combustion engine for use to combust a hydrocarbon-based fuel and that has a compression ratio of at least 8:1 with regard to the maximum size of its combustion chamber to the minimum size of the combustion chamber through the piston stroke.

In the illustrated example, the fuel-cracking heat exchanger 28 includes a heater 28a that serves to heat the closed feed line 30 and thus heat the hydrocarbon-based fuel 26 transported through the closed feed line 30. In one example, the heater 28a is an electrical heater or a flame heater. In other examples, the heater 28a is an exhaust line in communication with the diesel engine 22 to receive hot exhaust gases that heat the closed feed line 30 and hydrocarbon-based fuel 26. An electrical or flame heater can be used to supplement heating provided by the exhaust line.

In operation, the hydrocarbon-based fuel 26 is provided from the fuel tank 24 into the closed feed line 30. The hydrocarbon-based fuel 26 flows through the closed feed line 30 and into the fuel-cracking heat exchanger 28. Within the fuel-cracking heat exchanger 28, the heater 28a heats the closed feed line 30 and thus heats the hydrocarbon-based fuel 26.

The hydrocarbon-based fuel 26 is heated in the fuel-cracking heat exchanger 28 to a temperature that exceeds a cracking temperature of the hydrocarbon-based fuel 26 to thereby produce a cracked fuel. The cracking temperature for hydrocarbon is typically greater than 800° F./427° C., for example, depending on the particular composition of the hydrocarbon, whether a catalyst is used and residence time in the fuel-cracking heat exchanger 28. Further, since the closed feed line 30 does not permit entry of outside gases, such as air, the cracking of the hydrocarbon-based fuel 26 occurs in an environment that is substantially free of oxygen. For example, the hydrocarbon-based fuel 26 has less than 1 part-per-million (ppm) of oxygen. Thus, rather than combusting or partially combusting the fuel in an exothermic reaction or substantially forming carbonaceous coke deposits, at least a portion of the hydrocarbon-based fuel 26 endothermically cracks into simpler/lighter molecules, such as hydrogen, alkanes, alkenes and other light molecules.

The simpler/lighter molecules enhance combustion in the diesel engine 22 in several aspects. For example, the simpler/lighter molecules of the cracked fuel can combust rapidly in comparison to longer chain hydrocarbons and thus provide more power per stroke in the diesel engine 22. The cracked fuel also has a relatively higher energy density in comparison to the uncracked, hydrocarbon-based fuel 26, which provides for higher energy combustion. The higher energy density is due to endothermic cracking and the formation of molecules that have high energy bonding (e.g., unsaturated hydrocarbons). The endothermic cracking reactions function to store the thermal energy provided by the heater 28a in the form of chemical energy. The endothermic reaction forming the cracked fuel is capable of absorbing substantially more heat than fuels that act only as physical heat sinks. Additionally, the simpler/lighter molecules are comparatively more easily combustible than hydrocarbon and the cracked fuel therefore also combusts more completely than the uncracked, hydrocarbon-based fuel 26 for improved fuel efficiency and lower emissions.

FIG. 2 illustrates another example system 120 and fuel-cracking system S'. In this disclosure, like reference numerals designate like elements where appropriate and reference numerals with the addition of one-hundred or multiples thereof designate modified elements that are understood to incorporate the same features and benefits of the corresponding elements. In this example, the system 120 includes the diesel engine 22, the fuel tank 24 and the fuel-cracking heat exchanger 28, as described above. A closed feed line 130 connects the fuel tank 24 and the diesel engine 22 and extends through the fuel-cracking heat exchanger 28. Additionally, the system 120 is shown with a fuel deoxygenator device 140 and a cooler device 142. It is to be understood, however, that in some variations the system 120 may exclude either the fuel deoxygenator device 140 or the cooler device 142.

The fuel deoxygenator device 140 is located upstream of the fuel-cracking heat exchanger 28 with regard to fuel flow through the closed feed line 130, and the cooler device 142 is located upstream from the diesel engine 22 and downstream from the fuel-cracking heat exchanger 28. The closed feed line also includes a pump 144 for moving the hydrocarbon-based fuel 26.

In this example, the closed feed line 130 divides into a first section 130a and a second section 130b. The first section 130a, the second section 130b or both includes a flow control valve 132. The valves 132 may be in communication with an engine control unit or other type of controller (not shown) for controlling the operation thereof. The first section 130a runs through the fuel deoxygenator device 140, the fuel-cracking heat exchanger 28 and the cooler device 142. The second section 130b bypasses the fuel-cracking heat exchanger 28, as well as the fuel deoxygenator device 140 and the cooler device 142. The first section 130a and the second section 130b merge at node 146 prior to injection in the diesel engine 22. The node 146 may be outside of the diesel engine 22 or within the diesel engine 22 prior to injection into a combustion chamber, for example.

In operation, the pump 144 pressurizes and moves the hydrocarbon-based fuel 26 in the closed feed line 130. The flow of hydrocarbon-based fuel 26 divides such that a portion flows into the first section 130a and another portion flows into the second section 130b of the closed feed line 130. The portion in the first section 130a flows through the fuel deoxygenator device 140, which removes dissolved oxygen from the hydrocarbon-based fuel 26. The operation and design of deoxygenator devices are generally known and therefore will not be further described herein.

The deoxygenated hydrocarbon-based fuel 26 then flows into the fuel-cracking heat exchanger 28, similar to as described above. The fuel-cracking heat exchanger 28 heats the hydrocarbon-based fuel 26 to a supercritical state above its critical temperature and pressure where distinct liquid and gas phases do not exist. In this example, the fuel-cracking heat exchanger 28 is in communication with an exhaust line 146 carrying hot combustion exhaust gases from the diesel engine 22. The exhaust gases serve as the heater 28a to heat the closed feed line 130 and thus heat the hydrocarbon-based fuel 26, which provides energy recovery within the system 120. As described above the fuel is heated to a temperature that is greater than or equal to the cracking temperature, to at least partially crack the hydrocarbon-based fuel 26 into cracked fuel.

The cracked fuel, which is still in the supercritical state, then flows into the cooler device 142. As an example, the cooler device 142 is an air cooler, such as a radiator device, which receives airflow 142a there through to cool the closed feed line 130 and thereby cool the cracked fuel. The cooled, cracked fuel then continues through the second section 130a before merging at the node 146 with the portion of the uncracked fuel provided through the second section 130b.

As an example, unlike rockets or turbine engines that are designed for high temperature operation, the diesel engine 22 may include seals or other components that are not designed for such extreme temperatures. Cooling the cracked fuel thus ensures that the cracked fuel does not damage the seals or other components of the diesel engine 22 that the cracked fuel may come in contact with. Such seals and components may be made of polymers or other materials that have maximum use temperatures below the temperature of the cracked fuel. As a further example, the temperature to which the cracked fuel is cooled is kept as high as possible, but lower than the maximum use temperatures of the seals and other components. For example, this temperature and pressure is sufficient to maintain the cracked fuel in the supercritical state.

When the cracked fuel, which is in the supercritical state, is merged with the uncracked, hydrocarbon-based fuel 26 from the second section 130b of the closed feed line 130, and injected into the diesel engine cylinder, the cracked fuel expands into the uncracked fuel to essentially barbotage the uncracked fuel portion ("barbotage effect"). The barbotage effect effectively blows the uncracked fuel portion apart and thereby provides greater surface area of the uncracked fuel for faster combustion. That is, in addition the faster burning provided by the simpler/lighter molecules of the cracked fuel, the merging of the cracked fuel into the uncracked fuel portion also provides an unexpected additional benefit of enhancing combustion of the uncracked fuel. The valves 132 of the first section 130a and the second section 130b of the closed feed line 130 can be used to control a flow ratio and thereby control the barbotage effect, for example. The portion of hydrocarbon fuel directed to section 130a can be as much as 100% or reduced to a value such as 10% depending on the specific engine system and benefits desired. Alternately a simplified system without valves 132 may be employed.

Optionally, a section 130a' of the closed feed line 130 that extends through the fuel-cracking heat exchanger 28 includes an internal catalyst material 148, as shown in the cross-section of FIG. 3. The catalyst material 148 facilitates cracking of the hydrocarbon-based fuel 26 by lowering the temperature at which the fuel cracks, for example. The catalyst material 148 may be located on an inner diameter surface 150 of the second section 130a of the closed feed line 130. In one example, the catalyst material 148 is a zeolite-based catalyst.

Figure 4:
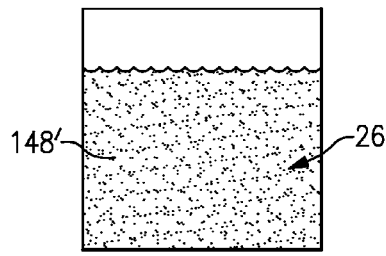
FIG. 4 illustrates a hydrocarbon-based fuel having a suspended catalyst material.

In addition to the catalyst material 148, or as an alternative to the catalyst material 148, the hydrocarbon-based fuel 26 may include a catalyst material 148' suspended therein, as shown in FIG. 4. As an example, the suspended catalyst material 148' is mixed as an additive into the hydrocarbon-based fuel 26. In a further example, the additive includes particles that include the catalyst material 148'. For instance, the particles are nano-sized particles that are generally less than 1000 nanometers in average diameter. The particles can be functionalized to enable suspension within the hydrocarbon-based fuel 26. For example, the particles are functionalized with groups that are compatible with the selected hydrocarbon-based fuel 26, such as alcohol-containing ligands that are branched or linear.

The suspended catalyst material 148' is provided in an effective amount within the hydrocarbon-based fuel 26. In one example, the suspended catalyst material 148' is present in an amount of 0.001-5 wt % of the hydrocarbon-based fuel 26. Similar to the catalyst material 148, the suspended catalyst material 148' may be a zeolite-based catalyst. In other examples, the suspended catalyst material 148' includes at least one of tungsten or molybdenum, and may be in the form of an oxide compound. As an alternative or in addition to zeolite, tungsten and/or molybdenum, the suspended catalyst material 148' may include a transition metal oxide, such as a transition metal oxide selected from groups 3-12 of the Periodic Table. In one example, the transition metal oxide is or includes tungsten oxide, zirconia or combinations thereof. In further examples, the suspended catalyst material 148' includes a solid superacid catalytic material, such as doped zirconia. In one example, the dopant is tungsten oxide.

In any of the examples herein, the hydrocarbon-based fuel 26 may additionally include a small amount of ethanol for the purpose of in-situ coke mitigation. As an example, the hydrocarbon-based fuel 26 includes 5% by weight or less of ethanol. In general, ethanol reduces energy density of the hydrocarbon-based fuel 26 but provides an offsetting benefit of mitigating pyrolytic coke formation above a critical temperature. As an example, above a critical temperature of 800° F./427° C. the hydrocarbon-based fuel 26 may form carbonaceous deposits, known as coke deposits, on the interior of the closed feed line 30/130. Such deposits can poison or block catalyst access and clog the closed feed line 30/130 or other components in the system 20/120. Furthermore, such deposits are thermally insulating and thus debit heat exchange.

Ethanol readily dissolves in hydrocarbon-based fuels such as kerosene and reacts at temperature sufficient to obtain fuel cracking in the hydrocarbon-based fuel 26 into ethylene and water. The water, in combination with the high temperature in the fuel-cracking heat exchanger 28, decomposes any coke deposits into hydrogen and relatively small carbon-based molecules that are washed away within the fuel. Thus, the addition of ethanol into the hydrocarbon-based fuel 26 mitigates pyrolytic coking that occurs above about 800° F./427° C.

Figure 5:
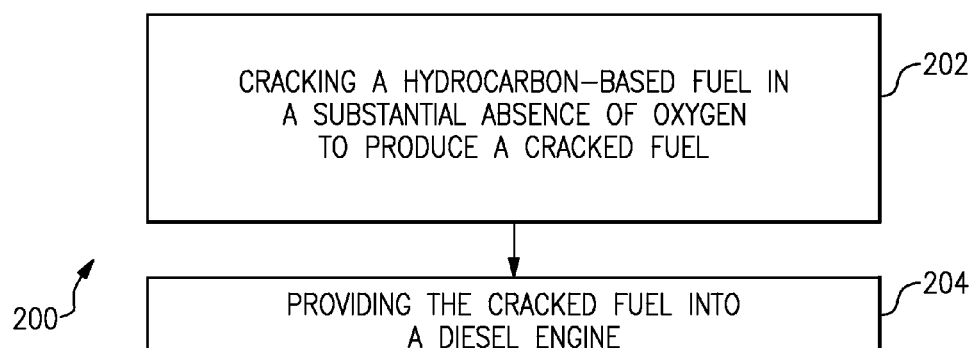
FIG. 5 illustrates a method of operating a fuel-cracking diesel engine system.

FIG. 5 illustrates an example method 200 of operating a diesel engine system. As an example, the method 200 embodies the operation of the systems 20/120 described herein, and vice versa. The method 200 includes step 202 of heating a hydrocarbon-based fuel in a substantial absence of oxygen to a temperature that is greater than a cracking temperature of the fuel to produce a cracked fuel. Step 204 includes providing the cracked fuel into a diesel engine.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A system comprising:
a diesel engine; and
a fuel-cracking system in fluid communication with a fuel supply to the diesel engine, the fuel-cracking system containing an environment that is substantially free of oxygen and the fuel of the fuel supply also being substantially free of oxygen, permitting the fuel to endothermically crack.

2. A system comprising:
a diesel engine;
a fuel-cracking system in fluid communication with a fuel supply to the diesel engine, wherein the fuel-cracking system includes a fuel-cracking heat exchanger and a closed feed line connecting the fuel supply and the diesel engine and extending through the fuel-cracking heat exchanger; and
a fuel deoxygenator upstream of the fuel-cracking heat exchanger and through which the closed line extends.

3. The system as recited in claim 2, wherein the fuel-cracking heat exchanger is in communication with an exhaust line of the diesel engine.

4. The system as recited in claim 2, wherein the closed feed line divides into a first section that extends through the fuel-cracking heat exchanger and a second section that bypasses the fuel-cracking heat exchanger.

5. The system as recited in claim 4, wherein at least one of the first section and the second section includes a flow control valve.

6. The system as recited in claim 4, wherein the first section and the second section merge at a location upstream of injection in the engine and downstream of the fuel-cracking heat exchanger.

7. The system as recited in claim 2, wherein the fuel-cracking heat exchanger includes an electric heater.

8. The system as recited in claim 2, wherein the fuel-cracking heat exchanger includes a flame heater.

9. The system as recited in claim 2, further comprising a cooler device located upstream of the diesel engine and downstream of the fuel-cracking heat exchanger, and through which the closed feed line extends.

10. The system as recited in claim 9, wherein the cooler device is an air cooler device.

11. The system as recited in claim 2, wherein a section of the closed feed line that extends through the fuel-cracking heat exchanger includes a catalyst material.

12. The system as recited in claim 2, further comprising a hydrocarbon-based fuel, and the hydrocarbon-based fuel includes, at a location prior to the fuel-cracking heat exchanger, ethanol.

13. The system as recited in claim 2, further comprising a hydrocarbon-based fuel, and the hydrocarbon-based fuel includes a suspended catalyst material therein.

14. A diesel engine system comprising:
a diesel engine;
a fuel tank;
a fuel deoxygenator device;
a fuel-cracking heat exchanger;
a cooler device; and
a closed feed line connecting the fuel tank and the diesel engine and extending through the fuel deoxygenator device, the fuel-cracking heat exchanger and the cooler device.

15. The system as recited in claim 14, wherein the closed feed line divides into a first section that extends through the fuel-cracking heat exchanger and a second section that bypasses the fuel-cracking heat exchanger.

16. The system as recited in claim 15, wherein the first section and the second section merge at a location upstream of injection in the engine and downstream of the fuel-cracking heat exchanger.

17. A method of operating a diesel engine system, the method comprising:
(a) cracking a hydrocarbon-based fuel in an environment substantially free of oxygen to produce a cracked fuel;
(b) providing the cracked fuel into a diesel engine; and
(c) deoxygenating the hydrocarbon-based fuel prior to the heating of said step (a).

18. The method as recited in claim 17, wherein the cracking includes heating the hydrocarbon-based fuel to a temperature sufficient to crack the hydrocarbon-based fuel, and then cooling the cracked fuel prior to said step (b).

19. The method as recited in claim 17, wherein said step (b) includes providing the hydrocarbon-based fuel in a supercritical state.

20. The method as recited in claim 17, further including dividing a flow of the hydrocarbon-based fuel prior to said step (a) such that a first portion of the hydrocarbon-based fuel is provided for the heating of said step (a) to produce the cracked fuel and a second portion of the hydrocarbon-based fuel bypasses the heating of said step (a).

21. The method as recited in claim 20, further including, after said step (a) and prior to said step (b), merging the cracked fuel and the second portion of the hydrocarbon-based fuel.

* * * * *